United States Patent
Rosen (10) Patent No.: US 12,337,937 B2
(45) Date of Patent: Jun. 24, 2025

(54) UNDERWATER MOTOR MODULE FOR A WATER SPORTS DEVICE

(71) Applicant: ROSEN SWISS AG, Stans (CH)

(72) Inventor: Hermann Rosen, Kastanienbaum (CH)

(73) Assignee: ROSEN 2 Holding AG, Stans (CH)

(*) Notice: Subject to any disclaimer, the term of this patent is extended or adjusted under 35 U.S.C. 154(b) by 499 days.

(21) Appl. No.: 17/755,569

(22) PCT Filed: Nov. 2, 2020

(86) PCT No.: PCT/EP2020/080700
§ 371 (c)(1),
(2) Date: May 2, 2022

(87) PCT Pub. No.: WO2021/084130
PCT Pub. Date: May 6, 2021

(65) Prior Publication Data
US 2022/0363349 A1    Nov. 17, 2022

(30) Foreign Application Priority Data
Nov. 1, 2019    (DE) .......................... 102019129576.9

(51) Int. Cl.
*B63B 32/10*    (2020.01)
*B60L 50/60*    (2019.01)
(Continued)

(52) U.S. Cl.
CPC .............. *B63B 32/10* (2020.02); *B60L 50/66* (2019.02); *B63B 1/24* (2013.01); *B63B 32/60* (2020.02);
(Continued)

(58) Field of Classification Search
CPC ........... B63B 32/10; B63B 32/60; B63B 1/24; B60L 50/66; B60L 2200/32; B60L 2250/50; B63H 1/16; B63H 11/08; B63H 2001/165
See application file for complete search history.

(56) References Cited

U.S. PATENT DOCUMENTS

| | | |
|---|---|---|
| 5,722,864 A | 3/1998 | Andiarena |
| 10,308,336 B1 | 6/2019 | Vermeulen |

(Continued)

FOREIGN PATENT DOCUMENTS

| | | |
|---|---|---|
| CN | 107161279 A | 9/2017 |
| CN | 108945334 A | 12/2018 |

(Continued)

OTHER PUBLICATIONS

Wetboard; iCrowdNewswire; Jun. 30, 2017. URL: https://icrowdnewswire.com/2017/06/30/wetboard-the-worlds-first-electric-powered-water-ski-wakeboard-hybrid [retrieved Jul. 6, 2022].

(Continued)

*Primary Examiner* — Stephen P Avila
(74) *Attorney, Agent, or Firm* — Husch Blackwell LLP (57) ABSTRACT

An underwater motor module for a water sports device is provided, which forms at least one flow channel each having at least one inlet opening and an outlet opening. The underwater motor module has a motor which is in the form of an internal rotor motor and comprises a hollow rotor, which concomitantly forms the flow channel by way of its inner side. On the outer side of the motor directed away from the flow channel is mounted outside the flow channel, and which bears blades. The motor also comprises an external stator arranged in a housing.

20 Claims, 12 Drawing Sheets

(51) Int. Cl.
  B63B 1/24     (2020.01)
  B63B 32/60    (2020.01)
  B63H 1/16     (2006.01)
  B63H 11/08    (2006.01)

(52) U.S. Cl.
  CPC .............. B63H 1/16 (2013.01); B63H 11/08 (2013.01); *B60L 2200/32* (2013.01); *B60L 2220/50* (2013.01); *B63H 2001/165* (2013.01)

(56) References Cited

U.S. PATENT DOCUMENTS

2015/0314849 A1* 11/2015 Jehangir ............... H02K 7/085
                                                    417/423.3
2018/0346085 A1   12/2018 White

FOREIGN PATENT DOCUMENTS

| DE | 102015004898 | A1 | 11/2015 |
| DE | 202017103703 | U1 | 7/2017  |
| DE | 102018113137 | A1 | 2/2019  |
| FR | 3029499      | A1 | 6/2016  |
| WO | 2019151242   | A1 | 8/2019  |

OTHER PUBLICATIONS

Frage: Plug & Play Efoil torpedo: Beluga Foil Project, efoil.builders, Aug. 2018. URL: https://efoil.builders/t/plug-play-efoil-torpedo-beluga-foil-project/2741 [retrieved Jul. 7, 2022].

Youtube: virus, Part 2 Electric Jet Surf Sup Foil, Full Carbon Fiber, prototype 1, Position 0:14, 2:31. Veröffentlicht May 3, 2017. URL: https://www.youtube.com/watch?v=FV1Qgv2K9wl [retrieved Jul. 7, 2022].

Nickw1881: Any interest in a custom e-foil ESC?, efoil.builders, Oct. 2018. URL: https://efoil.builders/t/any-interest-in-a-custom-e-foil-esc/2624 [retreived Jul. 7, 2022].

"User Manual Scubajet pro V1." Scubajetpro—User Manual (EN), https://www.scubajet.com/docs/SCUBAJET_User_Manual_SJ_PRO_EN_V1.pdf. [retrieved Jul. 7, 2022].

* cited by examiner

UNDERWATER MOTOR MODULE FOR A WATER SPORTS DEVICE

CROSS REFERENCE

This application claims priority to PCT Application No. PCT/EP2020/080700, filed Nov. 2, 2020, which itself claims priority to German Patent Application No. 10 2019 129576.9, filed Nov. 1, 2019, the entirety of both of which is hereby incorporated by reference.

FIELD OF THE INVENTION

The invention relates to an underwater motor module for a water sports device. Underwater motor modules serve to generate propulsion in water and can be coupled to and uncoupled from water sports devices.

BACKGROUND OF THE INVENTION

DE 20 2017 103 703 U1 and WO 2013 165 445 disclose water sports devices with a drive module that can be exchanged.

BRIEF SUMMARY OF THE INVENTION

The object of the present invention is to provide an underwater motor module and also an underwater drive and a water sports device each of which has an underwater module, which can be used in a variety of ways with high reliability. The object of the present invention is also to provide a method for producing a corresponding water sports device.

According to the invention, the object is achieved by an underwater motor module that forms at least one flow channel having at least one inlet opening and at least one outlet opening. The underwater motor module has a motor in the form of an internal rotor motor. The motor comprises a hollow rotor which concomitantly forms the flow channel on or by way of its inner side and bears blades on its inner side. The rotor is mounted outside the flow channel on at least one outer side directed away from the flow channel. The motor also comprises an external stator arranged in a housing.

The underwater motor module is in particular a drive unit that can be used in conjunction with different water sports devices. In particular, the underwater motor module is able to function autonomously and preferably does not require any provision of energy by a water sports device connected to it during operation and/or by other parts of a water sports device having the underwater motor module. The underwater motor module is intended to be coupled to water sports devices and to be non-destructively decoupled therefrom preferably via a coupling mechanism.

The flow channel is a cavity which extends in particular in a propulsion direction of the underwater motor module and within which water is displaced by the blades during operation. In particular, the flow channel has precisely one outlet opening, the longitudinal center axis of which coincides with the axis of rotation of the rotor at least during operation of the underwater motor module. In particular, the flow channel has precisely one or a plurality of inlet openings, through which water enters the flow channel during operation. In particular, the inlet opening(s) has/have a longitudinal center axis which coincides with the axis of rotation. As an alternative, the inlet opening(s) is/are preferably offset in the radial direction relative to the axis of rotation of the rotor and/or to the longitudinal center axis of the middle portion of the flow channel, i.e. is/are arranged decentrally.

The rotor, as motor component that rotates and is designed to output power during operation, is arranged within the stator of the motor, which does not rotate during operation. In particular, starting from its axis of rotation, in the radial direction the rotor is at least partially, in particular completely, surrounded by the stator. In this respect, the stator has a positionally fixed arrangement in relation to the external housing of the underwater motor module.

Irrespective of the blades, the rotor has in particular at least one round internal cross section, measured transversely to the axis of rotation, which preferably matches the other internal cross sections of the rotor that are offset in the direction of the axis of rotation. In particular, the rotor has an inner side which in the axial direction transitions at least steplessly into wall elements of the flow channel which are positionally fixed relative to the stator during operation and which, in particular in certain portions, have a constant inner diameter matching that of the rotor.

The rotor is mounted, preferably rotatably, in particular on the stator or on the housing. For this purpose, in particular at least one rotary bearing or a bearing inner ring bears against an outer side or outer surface of the rotor, with the inner side of the rotor being arranged at least partially between the outer surface and the axis of rotation. The rotor is preferably mounted by way of two rotary bearings, which preferably bear with mutually facing end faces against shoulders of the rotor or of a bearing ring connected thereto. The at least one rotary bearing thus preferably has a larger internal diameter than the flow channel and/or the rotor, irrespective of the blades in the same cross section.

The rotor bears in particular a plurality of blades that protrude into the flow channel in the direction of the axis of rotation. These blades are intended to displace water located within the rotor in the direction of the at least one outlet opening when the rotor is rotating. In particular, the axis of rotation does not intersect any of the blades, as a result of which the rotor has a central region which is free for the passage of water in the axial direction. In particular, the rotor with the blades forms a hubless and shaftless impeller with blades which are mounted only on the radially outer region and the radially inner ends of which are arranged freely in the flow channel. The above-described design, in particular of the rotor, makes it possible to provide an underwater motor module which is especially insusceptible to errors and the function of which, in comparison with propeller drives, for instance, is considerably less restricted by foreign bodies that are regularly found in the water. In addition, the underwater motor module according to the invention has an especially compact construction and can therefore be applied to a very wide variety of application areas and water sports devices.

The rotor preferably has permanent magnets arranged next to one another in the circumferential direction. These magnets are in particular arranged uniformly and evenly spaced apart from one another and from the axis of rotation. The permanent magnets are also preferably arranged on an outer side of the rotor and thus outside the flow channel. The permanent magnets are preferably retained on the rotor by or via a bearing ring. The bearing ring can preferably be fitted onto the rotor in the direction of the axis of rotation, or is fitted thereon during operation, as a result of which the permanent magnets are positioned between the bearing ring and at least one shoulder of the rotor in the axial direction. The permanent magnets have in particular inner and outer surfaces which are in the form of cylindrical shell sections and by way of which the permanent magnets are inserted into the underwater motor module in a particularly space-saving manner and enable a high degree of efficiency of the motor.

The rotor is mounted in particular via two bearings spaced apart from one another in the direction of the axis of rotation. The bearings are in particular ball bearings, preferably angular-contact ball bearings. These are preferably ceramic ball bearings. As an alternative or in addition, at least one of the bearings is in the form of a hydrodynamic sliding bearing. At least one of the two bearings or its outer ring bears against the housing and/or the stator in the radial and/or axial direction. These bearing points provide the best possible compromise between smooth running and structural space of the bearings.

The stator preferably has a plurality of coils which are arranged next to one another in the circumferential direction and are spaced apart from the permanent magnets in the radial direction. The coils are preferably wound around a winding axis arranged perpendicularly to the axis of rotation of the rotor. The axial extent of the coils preferably substantially corresponds to the axial extent of the permanent magnets. The combination of coils and permanent magnets in the above-described geometry and with the above-described bearing points enables an especially powerful electric motor which has an especially small construction relative to the flow channel, which favors a wide variety of applications for the underwater motor module.

In an advantageous embodiment of the invention, the underwater motor module has a module portion which, downstream of the rotor in the flow direction, has at least one guide blade and concomitantly forms the flow channel. In particular, the inner side of the module portion apart from the guide blade has the same radius as the rotor inner side. As a result, the rotor and module portion preferably form a flow channel with a constant cross section. The guide blade serves to guide the water displaced by the rotor, in particular for the purpose of reducing a swirl introduced into the flow of water by the rotor. Motor electronics, in particular having a motor controller, are preferably arranged in the module portion. The motor electronics are particularly preferably arranged around the same part of the axis of rotation as the guide blade and outside the flow channel. As a result, the underwater motor module has an even more compact construction and the necessary lengths of electrical conductors are reduced to the greatest possible extent by virtue of the adjacent arrangement of the motor electronics and the stator. The reduced swirl enables simplified handling of the driven water sports device when the underwater motor module is being used. The flow direction is in particular directed at least partially parallel to the axis of rotation of the rotor and/or in particular directed counter to the direction of motion of the underwater motor module. In particular, the guide blades are in the form of right-handed blades.

In an advantageous embodiment of the invention, the motor electronics have a plurality of elongate and preferably cylindrical capacitors arranged next to one another in the circumferential direction. Their longitudinal axes run in particular parallel to a central axis of the underwater motor module, which central axis in particular coincides with the axis of rotation of the rotor. This design of the capacitors of the motor electronics also results in an especially thin housing in the region of the guide blades. The motor electronics have in particular at least one circuit board which is annular or in the form of a segment of a ring and has an areal extent which runs in a plane transverse to the axis of rotation. This circuit board is preferably a double-level or multi-level circuit board. This adapted form of circuit board makes it possible to optimally attach the capacitors and to make the housing narrower. To prevent the ingress of water into the motor electronics, they are preferably potted inside an associated portion of the housing.

The motor electronics and the stator are preferably arranged in a common housing, which preferably has three parts. The housing preferably has a cylindrical basic shape and extremely preferably has cooling fins. The multi-part design of the housing makes it possible to exchange individual parts indiscriminately. Furthermore, the housing preferably has at least one region for fastening further elements of a water sports device which is to be formed. On the one hand, these elements relate to the mechanical fastening of the underwater motor module and take the form, for example, of fastening means such as flanges, snap hooks and the like, in particular detachable fastening means. On the other hand, these further elements involve at least one electrical or electronic interface for energy transfer and signal transmission.

The stator is advantageously potted by way of at least part of the housing. In particular, the stator is potted in a different part of the housing than the motor electronics. This also reliably prevents the ingress of water in the region between the rotor and the housing and still implements the aforementioned advantages. For this purpose, the potting compound is arranged in particular at least between the two bearings in the axial direction.

In an advantageous embodiment of the invention, at the front in the direction of travel, i.e. at the rear in the flow direction, the housing has an outer portion which widens in particular from the rotor. In particular, this outer portion has a larger radius than the axially adjacent portions of the underwater motor module. In particular, the inlet opening or one of the inlet openings is arranged through the outer portion and an inner portion of the underwater motor module that is between the outer portion and the axis of rotation in the radial direction. The at least one inlet opening is in particular annular or in the form of a segment of a ring. The underwater motor module preferably has inlet openings on opposite sides of the underwater motor module. By virtue of this design of the inlet opening(s), the water flowing in to the rotor flows at least in certain portions and at least to some extent in the radial direction and the flow channel has a branched inlet channel or an inlet channel with an annular cross section. This design of the inlet opening makes it possible to arrange further components of the water sports device coaxially and upstream of the underwater motor module in the direction of travel, without the inflow of water to the rotor being impeded as a result. This allows the use of the underwater motor module in particular for water sports devices of different lengths and configurations.

The underwater motor module preferably has a front connection region for an energy storage module and/or a control unit. The connection region serves in particular for the detachable coupling thereof. The connection region is formed in particular at least substantially between the inlet opening and the rotor axis. This connection region makes it possible to connect in particular at least substantially cylindrical components to the underwater motor module, again without compromising the inflow of water to the rotor.

The object is also achieved by an underwater drive comprising an underwater motor module as described above and an energy storage module. The energy storage module is arranged in particular on the connection region of the underwater motor module and provides energy for the rotation of the rotor.

The energy storage module preferably has a plurality of battery packs which are arranged one behind another in the longitudinal direction in an energy storage module housing. In this case, the energy storage module housing is in particular that part of the energy storage module that is to be coupled directly to the underwater motor module. In particular, the energy storage module has at least four and at most ten battery packs, each preferably having a multiplicity of battery cells. The energy storage module preferably also has battery control electronics, which are positioned between the battery packs and the couplable portion of the energy storage module housing. It is especially well protected as a result. The energy storage module preferably has double blocks, in the case of which two outer housing parts and at least one housing middle part are screwed against one another and thus form a frame for a group of battery cells. Both the outer housing parts and the housing middle part of such a double block have in particular guide or fastening webs, which in the assembled state and to some extent are arranged between the battery cells and to some extent have receptacles for the fastening means. The energy storage module housing preferably has an at least substantially cylindrical cross section and an axial longitudinal extent, as a result of which it supplements the underwater motor module in a streamlined manner.

The energy storage module preferably has a handle. The handle is arranged in particular at the end facing away from the underwater motor module. In particular, the handle encloses a continuous recess. The handle makes it easier to handle the underwater drive and/or the energy storage module and also results in a tapering of the front part of the underwater drive, which leads to lower flow resistance.

The object is also achieved by an underwater drive having an underwater motor module as described above and a control unit which is arranged in particular on the connection region of the underwater motor module. The control unit is preferably designed to generate control signals for the motor. In particular, the power or rotational speed of the motor during operation depends on the control signals. This structure gives the underwater drive a streamlined design and in particular allows the application of different control units for different users.

In a further development according to the invention, the underwater motor module is distinguished in that assigned to the control unit is a headset comprising at least one head sensor for recording movements of at least a part of the head of a person operating the underwater motor module during operation. This allows the arms and legs to be moved freely without holding any control means in the hand. For example, the propulsion speed can be increased or reduced by targeted movement sequences that can be established or are established in advance and that can be predefined or learned by the control unit, for example repeated nodding or shaking of the entire head. To detect this movement, the headset has an acceleration sensor in the form of a head sensor, for example.

In addition to the flow channel, one of the above-described underwater drives according to the invention preferably has a flow cooling channel which leads through the energy storage module and preferably opens into the flow channel. The flow cooling channel makes it possible to dissipate heat losses that occur during operation in the region of the energy storage module and thereby to limit the loading of the component. In particular, the flow cooling channel runs coaxially with the flow channel portion formed by the rotor and preferably through the battery packs.

In an advantageous embodiment of the invention, the underwater drive has at least one control element that is designed to influence the alignment of a flow of water produced during operation. The control element is formed in particular by at least one alignable part of the underwater motor module and/or a nozzle element. In particular, the nozzle element forms the outlet opening and has an internal cross section that tapers in the flow direction. The nozzle element is preferably mounted such that it can be pivoted in different directions by means of a ball joint. In addition, the control element preferably comprises an actuator or control element that is connected to the alignable part and in particular is electrically actuated. The control element makes it possible to change the direction of motion of the underwater drive and/or of the water sports device coupled thereto during operation.

The underwater drive preferably comprises a rotor having blades that can be rotated about a respective blade axis. This allows different advancement rates to be achieved while maintaining the same rotational speed.

Such a rotor preferably has a multi-part form with a blade carrier, for example in the form of an impeller ring, and a displacement ring that can be displaced relative to the blade carrier along an axis of rotation, the displacement ring acting on respective blade receptacles by way of respective displacement pins for the purpose of rotating the blades.

The object is also achieved by a water sports device having the underwater drive described above. The water sports device preferably has a floating body, which in particular takes the form of a floating board, and a hydrofoil device. The hydrofoil device preferably has a plurality of hydrofoils. The hydrofoil device is fastened to the floating body in particular by means of a retaining device. The retaining device preferably has a link on which the hydrofoil device is arranged. The hydrofoil device preferably has at least two hydrofoils. In particular, the hydrofoil device comprises a receptacle on which the at least one hydrofoil is arranged in a positionally fixed manner and which is coupled directly to the retaining device. The retaining device can transfer the hydrofoil device from a rest and/or starting position close to the floating body into an operating position below the floating body. In the operating position and during a forward movement, on account of the buoyancy induced by the hydrofoil device the floating body can be transferred in particular into a position spaced apart from a water surface. The underwater module is preferably at least partially formed as part of the hydrofoil device.

The object is also achieved by a method for constructing and/or manufacturing a water sports device which has a modular structure comprising a floating body module and the modules of which can be connected to one another via interfaces and are connected to one another during operation. The water sports device is in particular one as previously described. According to the method, a server device and a program-controlled input interface for user-defined inputs are provided on a preferably mobile terminal that is in particular remote from the server device. The modules are mapped in a computer program of the server device and/or of the terminal. At least one outer contour of the floating body module of the water sports device can be freely defined or can be selected from a series of predefined modules by a user, at least within certain limits. Various sensors, such as e.g. gyro sensors, speed sensors, position sensors (GPS, GLONASS, BeiDou etc.), distance sensors (echo sounder, sonar), infrared sensors and inclination sensors, may also be selected as selection criteria. Furthermore, for example, various drives or a plurality thereof, associated controllers and different man-machine interfaces can be selected. In the case of a water sports device that can be designed as a hydrofoil board or foil board, the hydrofoil device with in particular the shape, color and number of hydrofoils, the retaining device and any control units can also be selected. These differ, for example, in the number of storable travel profiles and predefinable travel modes.

Manufacturing information is provided in an automated manner on the basis of the outer contour. The floating body module manufactured in accordance with this can be connected to one module, in particular multiple modules, to complete the water sports device. This method expands the applicability of water sports devices according to the invention to the extent that different users can obtain and use a water sports device that is optimally suited to them, depending on their physical conditions and abilities.

An automated check is preferably carried out on the server device or the terminal in terms of structural properties, in particular floating-related properties, of the water sports device. This immediately indicates to the user of the method to what extent the configured floating device is suitable for him.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

The features of the exemplary embodiments according to the invention that are explained below may also be entities of the invention individually or in combinations other than those presented or described, but always at least in combination with the features of either one of claims 1 and 18. If appropriate, parts which act functionally in the same way are provided with identical reference numerals.

Figure 1:
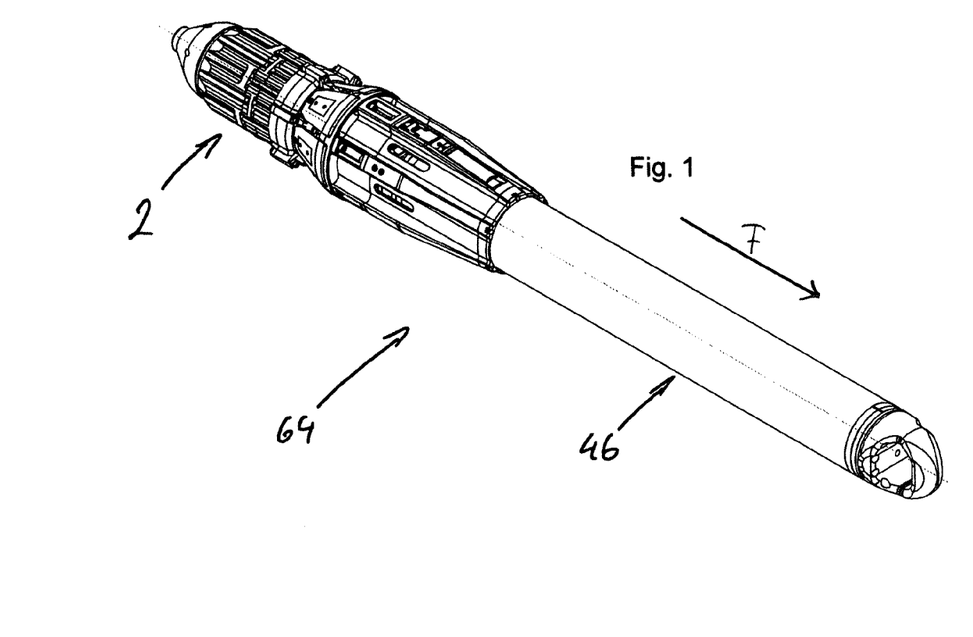
FIG. 1 shows an overview of an underwater drive according to the invention.
Figure 2:
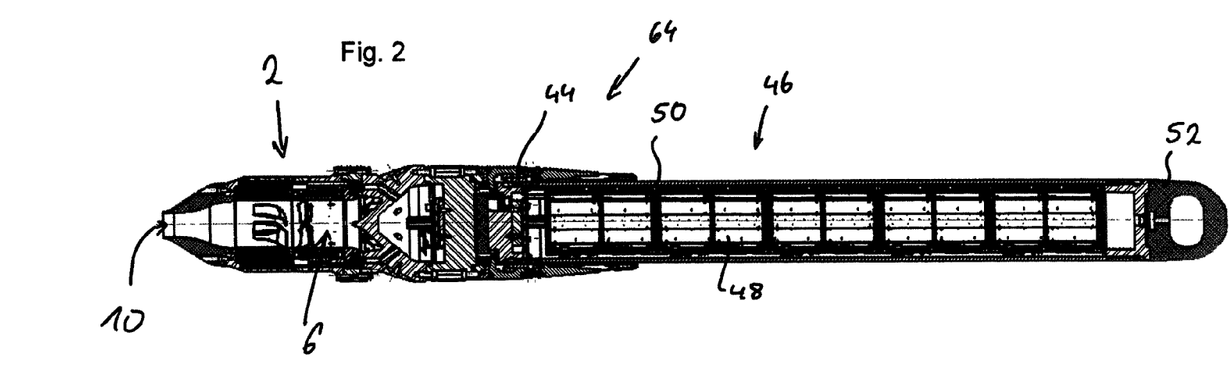
FIG. 2 shows a longitudinal section of the underwater drive according to FIG. 1.
Figure 3:
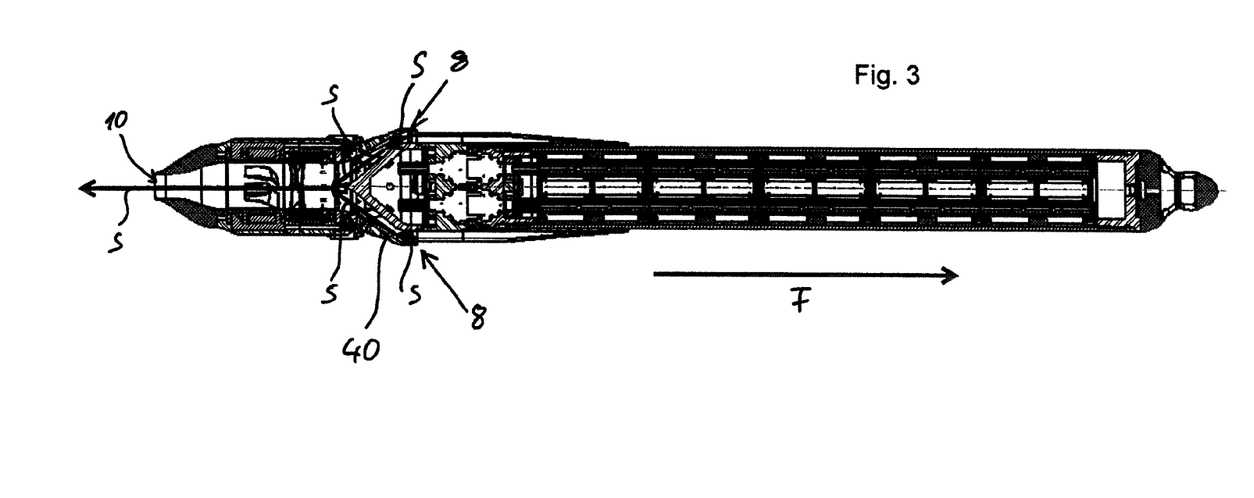
FIG. 3 shows a further longitudinal section of the underwater drive according to FIG. 1.
Figure 4:
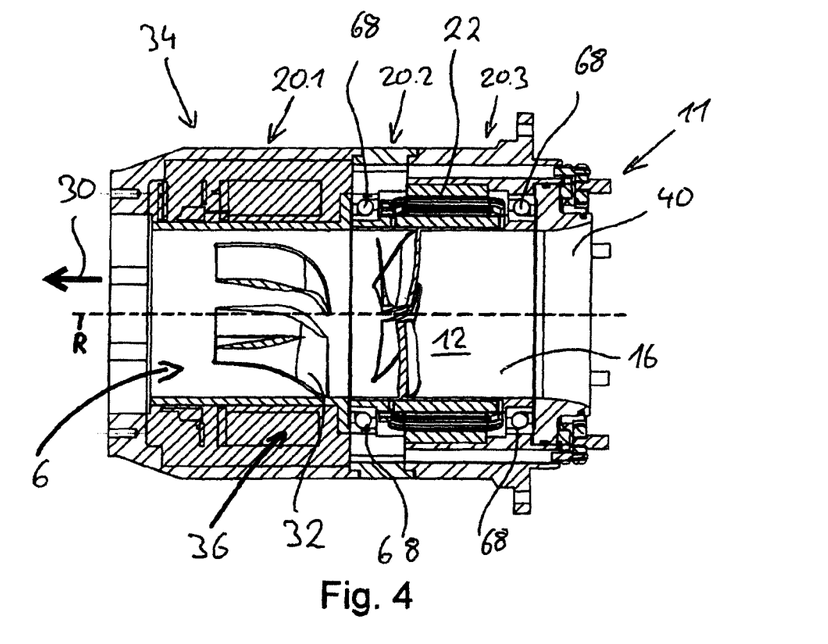
FIG. 4 shows a longitudinal section of part of the underwater motor module according to FIG. 1.

FIGS. 1 to 3 show an underwater drive 64 composed of an underwater module 2 and an energy storage module 46. The underwater motor module 2 has a flow channel 6 with multiple inlet openings 8 and an outlet opening 10 (cf. FIG. 3). The underwater motor module 2 has a motor 11 which is in the form of an internal rotor motor and comprises a hollow rotor 16, which concomitantly forms the flow channel 6 by way of its inner side 12 (cf. FIG. 4). The rotor 16 bears blades 18 which protrude into the flow channel 6. During operation, the rotor 16 rotates about an axis of rotation R. On its outer side 14 directed away from the flow channel, the rotor 16 is mounted outside the flow channel 6 by way of two bearings 68. In addition, the underwater motor module 2 comprises an external stator 22 arranged in a housing 20.

Figure 5:
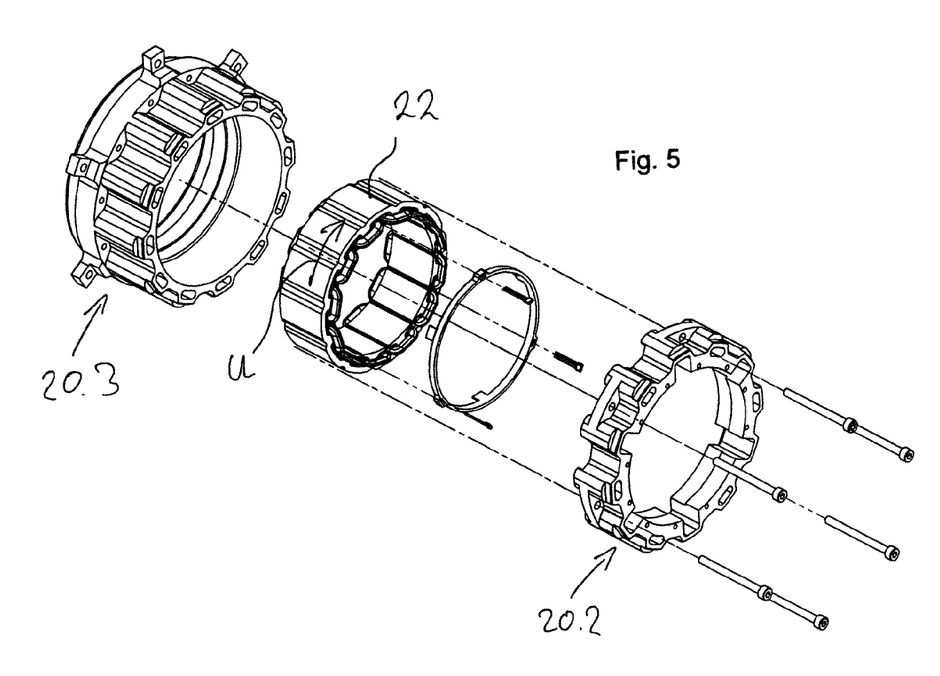
FIG. 5 shows an exploded illustration of a first part of that part of the underwater motor module that is illustrated in FIG. 3.
Figure 6:
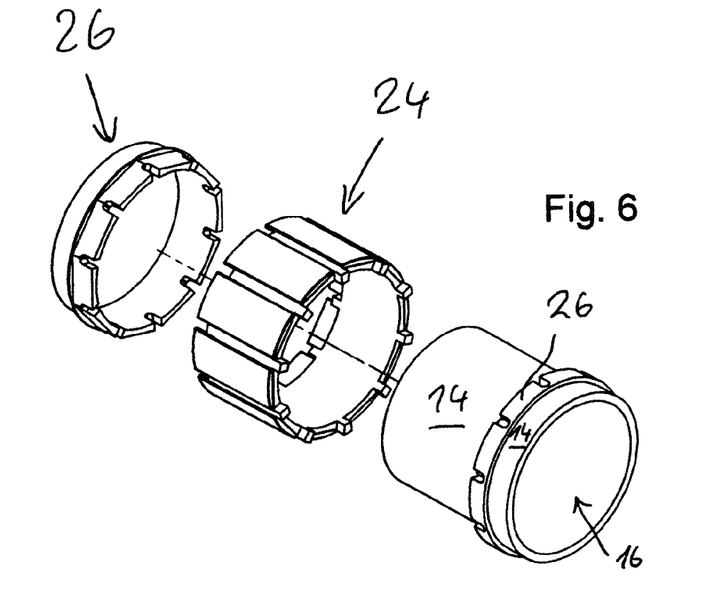
FIG. 6 shows an exploded illustration of a second part of that part of the underwater motor module that is illustrated in FIG. 3.

As is shown in FIG. 6, the rotor 16 comprises a total of ten permanent magnets 24 arranged next to one another in the circumferential direction. These permanent magnets 24 are retained via a bearing ring 26 of the rotor 16. As is shown in FIG. 5, the stator 22 has a total of twelve coils 28 which are arranged next to one another in the circumferential direction U and have a positionally fixed arrangement in relation to the housing 20. A module portion 34, which concomitantly forms the flow channel 6 and has a plurality of guide blades 32, is arranged upstream of the rotor 16 in the flow direction 30 or downstream of the rotor in the direction of travel. Motor electronics 36 having a motor controller are arranged in the module portion 34 spaced apart radially from the guide blades 32.

Figure 7:
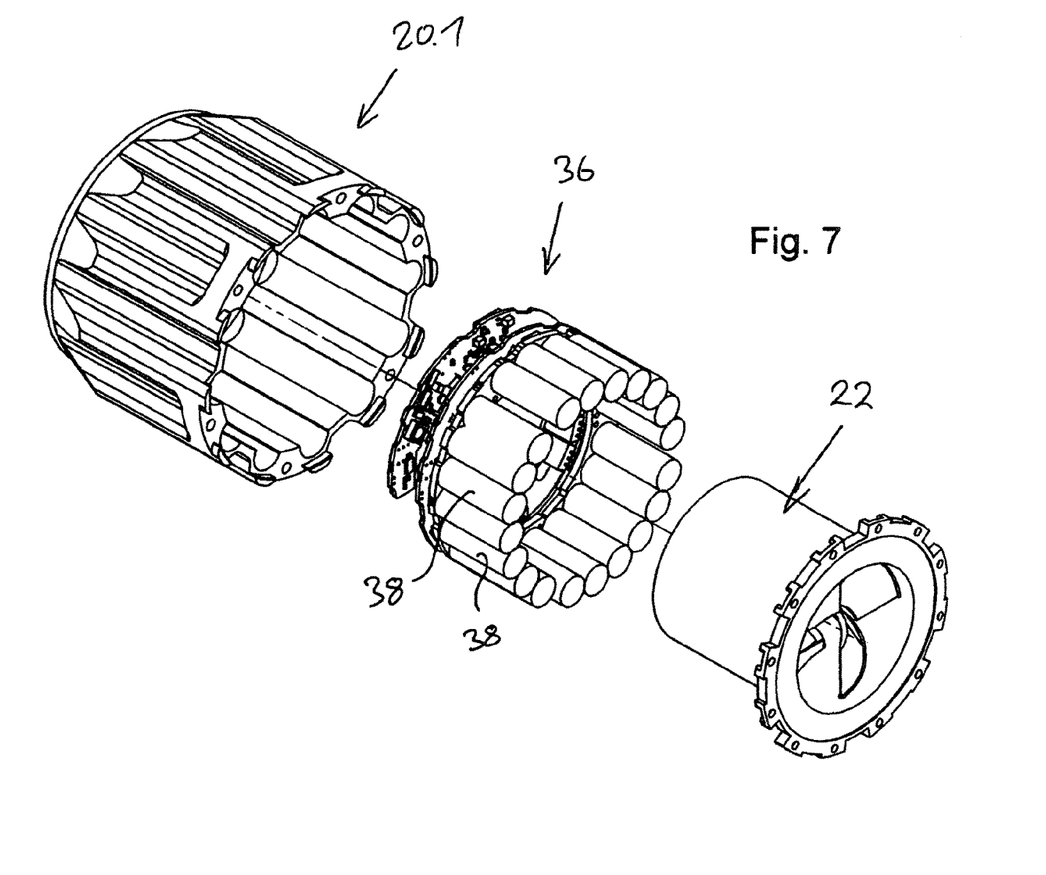
FIG. 7 shows an exploded illustration of a third part of that part of the underwater motor module that is illustrated in FIG. 3.

The motor electronics 36 comprises a plurality of elongate and cylindrical capacitors 38 which are arranged next to one another in the circumferential direction U and the longitudinal axes of which run parallel to the axis of rotation (cf. FIG. 7). The housing 20, in which the motor electronics 36 and the stator 22 are arranged, comprises the housing parts 20.1, 20.2 and 20.3 (cf. FIG. 4). The stator 22 is potted inside the housing 20 in the same way as the motor electronics 36.

Figure 8:
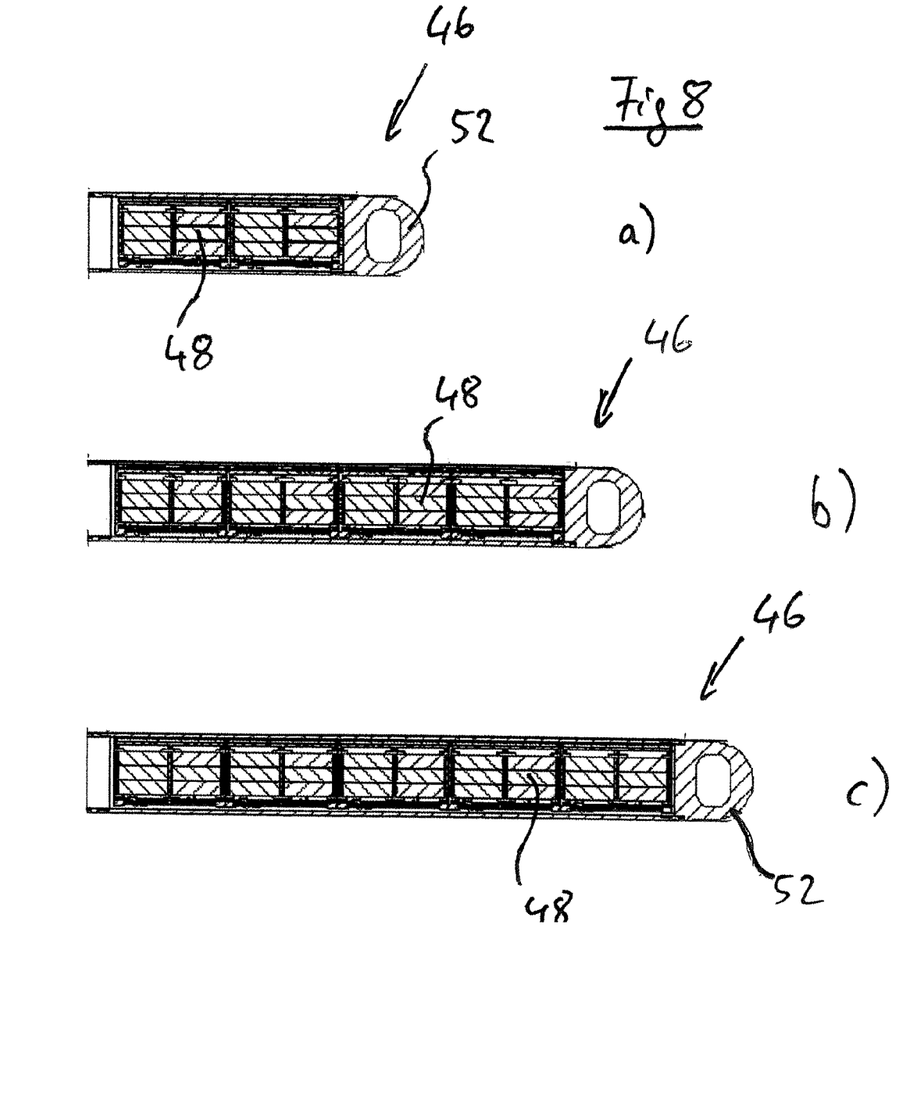
FIGS. 8a to 8c show longitudinal sections of different energy storage modules of an underwater drive according to the invention.

At the rear in the flow direction or at the front in the direction of travel, the housing 20 has a widening outer portion 40, which forms the multiple inlet openings 8 in the form of a segment of a ring or an annular inlet opening 8 interrupted by webs (cf. FIGS. 2 and 3, which show longitudinal sections of the same underwater drive 64 at different rotational angles). Flow arrows S illustrate the path of the water from the inlet opening out of the downstream outlet opening. Between the inlet openings 8 and offset to the front, the underwater motor module 2 has a front connection region 44 for the energy storage module 46. The energy storage module 46 comprises eight battery packs 48 which are arranged one behind another in the longitudinal direction L in an energy storage module housing 50 which is connected to the underwater motor module 2 in the connection region 44. Alternative energy storage modules 46 have four or ten battery packs 48 (cf. FIGS. 8a to 8c). Regardless of the number of battery packs 48, the energy storage module 46 has a handle 52 in the region which is at the front in the direction of travel F.

Figure 9:
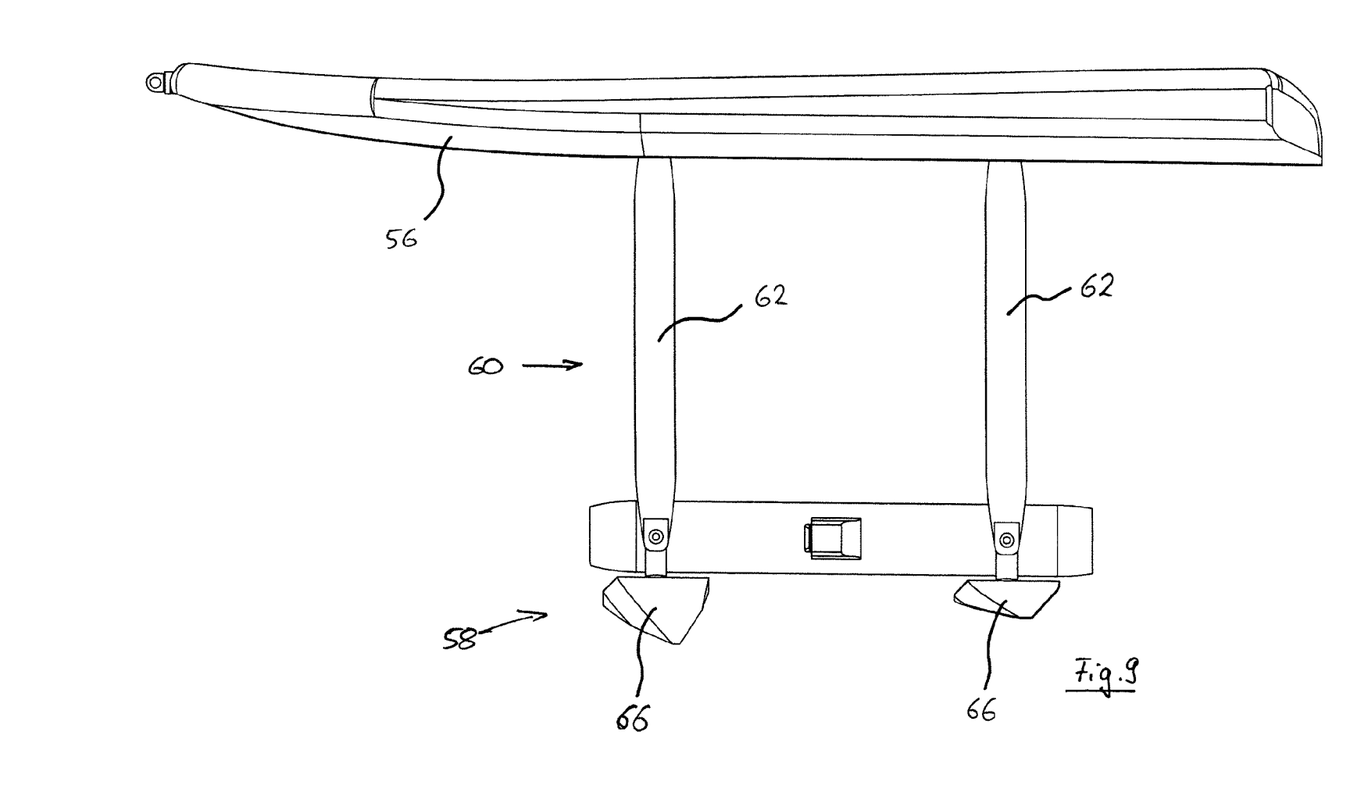
FIG. 9 shows a side view of a water sports device according to the invention.

The water sports device 3 according to FIG. 9 has an underwater drive 64. In addition, the water sports device 3 has a floating body 56 in the form of a floating board and a hydrofoil device 58 with two hydrofoils 66. The hydrofoil device 58 is fastened to the floating body 56 by means of a retaining device 60. The retaining device 60 comprises two links 62, by way of which the hydrofoil devices 58 are arranged on the floating body 56 so as to be able to move indirectly. The retaining device 60 allows the hydrofoil device 58 to be transferred from a rest and/or starting position close to the floating body 56 into an operating position below the floating body 56. In the operating position and during a forward movement of the water sports device 3, on account of the buoyancy brought about by the hydrofoils 66 the floating body 56 can be transferred into a position spaced apart from the water surface. The underwater motor module 2, which is shown only schematically in FIG. 9, is formed as part of the hydrofoil device 58.

Figure 10:
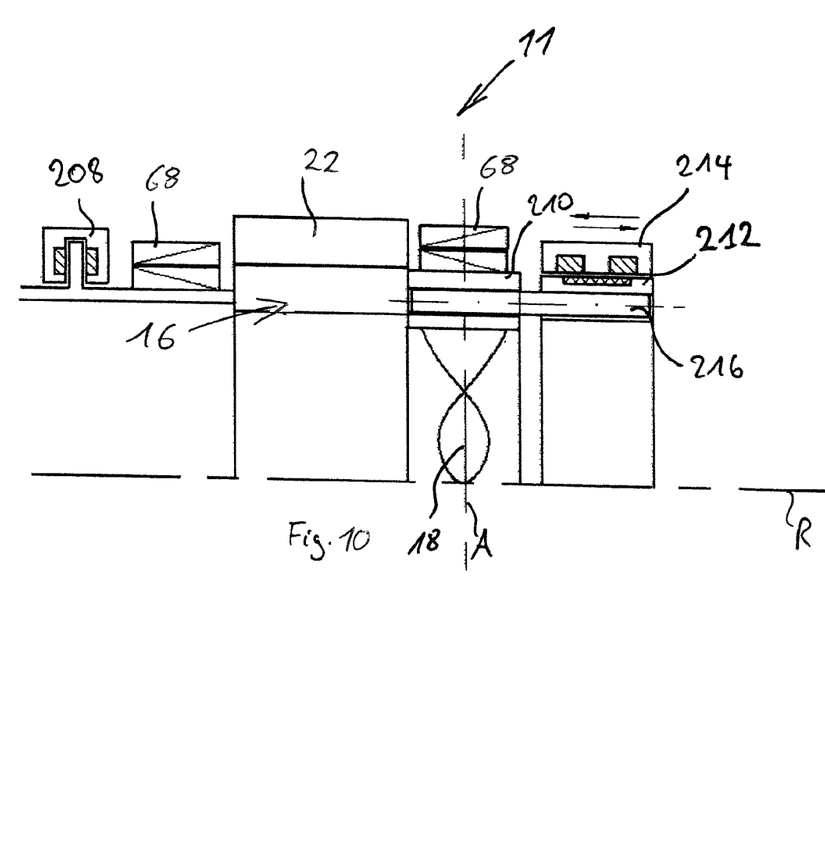
FIG. 10 shows a partial view of a further exemplary embodiment in a longitudinal section.
Figure 11:
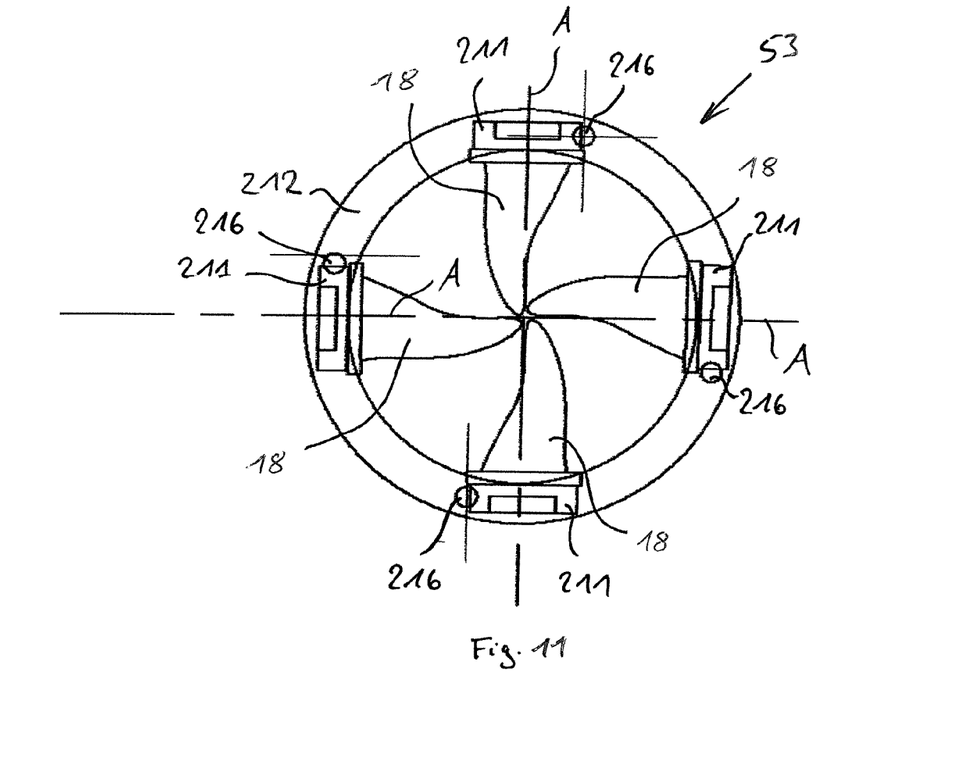
FIG. 11 shows a partial view of the exemplary embodiment according to FIG. 10 in cross section.
Figure 12:
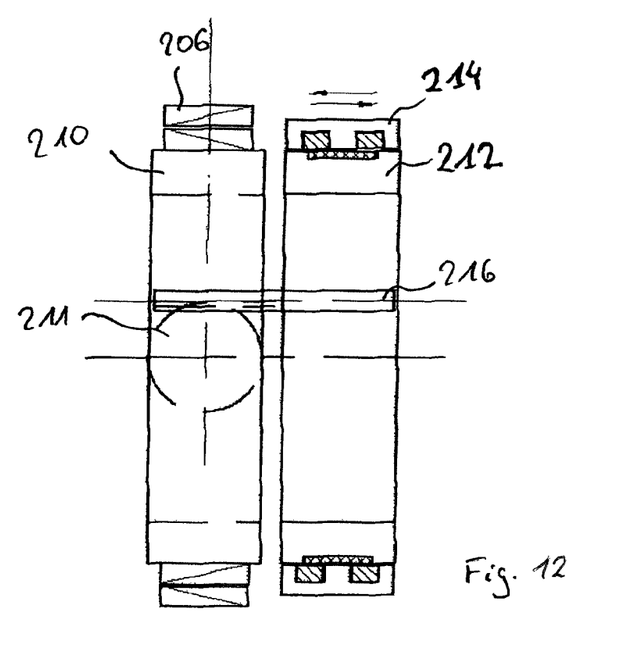
FIG. 12 shows a further partial view of the subject matter according to the invention of FIG. 11 in a longitudinal section.

FIGS. 10 to 12 schematically show an advantageous embodiment of an underwater motor module 2 provided with an impeller 53, in which underwater motor module blades 18 can be rotated about a blade axis A—preferably by at least +/−10°—and therefore can be adjusted in their angle of attack. In this respect, the individual blades 18 are connected to one another only indirectly. For this purpose, the underwater motor module 2 has a motor 11 which is in the form of an internal rotor motor and has a stator 22 and a rotor 16. On its outer side directed away from the flow channel, the rotor 16 is mounted by way of two radial bearings 68, which in the present case are in the form of magnetic bearings, and an axial bearing 208, which in the present case is likewise in the form of a magnetic bearing. The multi-part rotor 16 has an impeller ring 210 which has rotatable blade receptacles 211. A blade 18 is arranged on each of the blade receptacles 211. The propulsion device 50 has an adjusting ring 212 arranged coaxially along an axis of rotation R in relation to the rotor 16 or to the impeller ring 210. The adjusting ring 212 is likewise hollow, concomitantly forms the flow channel and is mounted on its outer side directed away from the flow channel. The spacing between the adjusting ring 212 and the impeller ring 210 in the axial direction (axis of rotation R) can be modified in this respect. In the present case, this is achieved by an actively electromagnetically actuable adjusting means in a magnetic bearing 214 of the adjusting ring 212. The adjusting ring 212 engages with cylindrical outer portions of the blade receptacles 211 via individual adjusting pins 216. When the axial spacing between the adjusting ring 212 and the impeller ring 210 is modified via the magnetic bearing 214, the interaction of the adjusting pins 216 and the blade receptacles 211 converts this translational movement into a rotational movement of the blades 18, via which rotational movement the blades 18 can be pivoted. As a result, the angle of attack of the blades 18 can be set and likewise be defined.

The invention claimed is:

1. An underwater motor module for a water sports device, the underwater motor module comprising:
   at least one flow channel, each of said at least one flow channel having at least one inlet opening and an outlet opening;
   a motor, which is an internal rotor motor, the motor including:
   a hollow rotor which concomitantly forms the flow channel by way of an inner side of the hollow rotor, and which on an outer side directed away from the flow channel is mounted outside the flow channel,
   blades bourn by the inner side and
   an external stator arranged in a housing,
   wherein a module portion, which has at least one guide blade and concomitantly forms the flow channel, is arranged downstream of the rotor in the flow direction, in which module portion, radially from the guide blade as viewed in the flow direction, are arranged motor electronics.

2. The underwater motor module as claimed in claim 1, wherein the rotor has permanent magnets which are arranged next to one another in the circumferential direction (U) and which are retained on the rotor.

3. The underwater motor module as claimed in claim 1, wherein the stator has a plurality of coils arranged next to one another in the circumferential direction (U).

4. The underwater motor module as claimed in claim 1, wherein the motor electronics have a plurality of elongate capacitors arranged next to one another in the circumferential direction (U).

5. The underwater motor module as claimed in claim 1 wherein the motor electronics and the stator are arranged in the housing.

6. The underwater motor module as claimed in claim 4, wherein the stator is potted in at least one of the parts of the housing.

7. An underwater motor module for a water sports device, the underwater motor module comprising:
   at least one flow channel, each of said at least one flow channel having at least one inlet opening and an outlet opening;
   a motor, which is an internal rotor motor, the motor including:
   a hollow rotor which concomitantly forms the flow channel by way of an inner side of the hollow rotor, and which on an outer side directed away from the flow channel is mounted outside the flow channel,
   blades bourn by the inner side and
   an external stator arranged in a housing,
   wherein at the rear in the flow direction, the housing has a widening outer portion, which forms the at least one inlet opening, which is annular or in the form of a segment of a ring.

8. An underwater motor module for a water sports device, the underwater motor module comprising:
   at least one flow channel, each of said at least one flow channel having at least one inlet opening and an outlet opening;
   a motor, which is an internal rotor motor, the motor including:
   a hollow rotor which concomitantly forms the flow channel by way of an inner side of the hollow rotor, and which on an outer side directed away from the flow channel is mounted outside the flow channel,
   blades bourn by the inner side,
   an external stator arranged in a housing, and
   a front connection region for an energy storage module and/or a control unit.

9. An underwater drive comprising:
   an underwater motor module as claimed in claim 8; and
   an energy storage module.

10. The underwater drive as claimed in claim 9, wherein the energy storage module comprises a plurality of battery packs which are arranged in an energy storage module housing, which is detachably connected to the underwater motor module.

11. The underwater drive as claimed in claim 9 wherein the energy storage module has a handle.

12. The underwater drive as claimed in claim 9, wherein the control unit is designed to generate control signals for the motor.

13. The underwater drive as claimed in claim 9, wherein in addition to the flow channel, a flow cooling channel leads through the energy storage module.

14. The underwater drive as claimed in claim 9, wherein further including at least one control element, which influences the alignment of a flow of water produced during operation and which is formed by at least one alignable part of the underwater motor module and/or a nozzle element.

15. The underwater drive as claimed in claim 9, wherein the rotor has blades that can be rotated about a respective blade axis (A).

16. The underwater drive as claimed in claim 15, wherein the rotor has a multi-part form with a blade carrier in the form of an impeller ring and an adjusting ring that can be displaced relative to the blade carrier along an axis of rotation (R) and that acts on respective blade receptacles by way of respective displacing means for the purpose of pivoting the blades.

17. A water sports device comprising:
an underwater drive as claimed in claim 9.

18. The water sports device as claimed in claim 17, further including:
a floating body; and
a hydrofoil device which is fastened to the floating body by means of a retaining device,
wherein the hydrofoil device arranged on a link of the retaining device has one or more hydrofoils and via the retaining device can be transferred from a rest and/or starting position close to the floating body into an operating position below the floating body,
wherein, in the operating position and during a forward movement, on account of the buoyancy brought about by the hydrofoil device the floating body can be transferred into a position spaced apart from a water surface, wherein the underwater motor module is formed at least partially as part of the hydrofoil device.

19. A method for constructing a water sports device which has a modular structure comprising a floating body module and the one or more modules of which can be connected to one another via interfaces and are connected during operation, as claimed in claim 18, the method comprising the steps of:
providing user-defined inputs to a server device via a program-controlled input interface on a terminal, wherein
mapping the modules are in a computer program of the server device and/or of the terminal, and wherein at least one outer contour of the floating body module of the water sports device can be freely defined by a user,
providing manufacturing information in an automated manner on the basis of the outer contour, and
manufacturing the floating body module in accordance with the manufacturing information for connection to a module to complete the water sports device.

20. The method as claimed in claim 19, wherein an automated check is carried out on the server device or the terminal in terms of structural properties of the water sports device.

* * * * *